United States Patent [19]

Melachouris et al.

[11] Patent Number: 5,318,793
[45] Date of Patent: Jun. 7, 1994

[54] POWDERED COFFEE WHITENER CONTAINING REFORMED CASEIN MICELLES

[75] Inventors: Nicholas Melachouris, Westlake Village; Kenneth R Moffitt, Los Angeles; Casimir E. Rasilewicz, Woodland Hills; George F. Tonner, Simi Valley, all of Calif.

[73] Assignee: Nestec S.A., Vevey, Switzerland

[21] Appl. No.: 937,574

[22] Filed: Aug. 31, 1992

Related U.S. Application Data

[62] Division of Ser. No. 760,663, Sep. 16, 1991, Pat. No. 5,173,322.

[51] Int. Cl.$^5$ .............................................. A23C 11/08
[52] U.S. Cl. ................................... 426/588; 426/580; 426/626; 426/804
[58] Field of Search ................. 426/580, 588, 656, 804

[56] References Cited

U.S. PATENT DOCUMENTS 2,744,891  5/1956  Waugh .
3,995,070  11/1976  Nagasawa ........................... 426/580

FOREIGN PATENT DOCUMENTS 0345226   6/1989  European Pat. Off. .
89/05587   6/1989  PCT Int'l Appl. .
89/11798  12/1989  PCT Int'l Appl. .

*Primary Examiner*—Carolyn Paden

[57] ABSTRACT

Reformed casein micelles are produced from an aqueous solution or dispersion of commercially available processed casein by the sequential addition, over an extended period of time, of calcium ions and a soluble phosphate salt, after which the aqueous reaction medium is concentrated such as by ultrafiltration or diafiltration, to increase the level of casein micelles thereon and remove excess salts. The reformed casein micelles are used as a complete or partial replacement for fat in a variety of food products, particularly coffee whiteners. Coffee whiteners containing reformed casein micelles as a replacement for the fat component have functional and organoleptic properties equivalent to conventional coffee whiteners.

3 Claims, No Drawings

POWDERED COFFEE WHITENER CONTAINING REFORMED CASEIN MICELLES

This is a divisional of co-pending application Ser. No. 07/760,663 filed Sep. 16, 1991 now U.S. Pat. No. 5,173,322.

This invention relates to the production of reformed casein micelles and to the use of such micelles as a complete or partial replacement for fat in food product formulations. More particularly, the invention relates to a non-dairy coffee whitener containing reformed casein micelles as a replacement for the fat or oil normally used in whitener formulations.

BACKGROUND OF THE INVENTION

Casein is the principal protein of milk, with the casein being present as micelles, that is, naturally occurring proteinaceous microparticles comprising a calcium caseinate-phosphate complex having a diameter of from about 0.1 to 0.4 microns. It has been suggested heretofore that concentrated, substantially non-aggregated casein micelles obtained by the ultrafiltration of skim milk may be used as a fat substitute in certain food products such as whipped or quiescently frozen or refrigerated desserts, puddings, whipped toppings, sauces, dips, and the like.

However, when casein is isolated for commercial utilization, such as in the production of acid casein or alkali metal caseinates, the micelles are destroyed. Consequently, since such commercially available casein products no longer contain casein in micelle form, they are not suitable for use as a fat replacer.

SUMMARY OF THE INVENTION

The present invention is directed to the production of reformed casein micelles and to the use of such reformed casein micelles as a full or partial replacement for fat in food product formulations, particularly as a replacement for the fat typically found in coffee whitener formulations. Reformed casein micelles are produced by the sequential addition to an aqueous solution of an alkali metal caseinate of calcium ions over an extended period of time, followed by the addition of a soluble phosphate salt, under controlled shear. An alkaline reagent, such as sodium hydroxide, is included in the reaction mixture, preferably with the phosphate salt, to provide the reaction mix with a pH of above about 6.0. The aqueous reaction medium containing casein micelles formed in situ is washed and concentrated such as by ultrafiltration or diafiltration to remove excess salts and increase the level of micelles in the aqueous medium.

The reformed casein micelles thus produced have an average particle size between 0.1 to 0.5 microns, and are suitable for use as a fat replacer in a variety of food products. Of particular interest are non-dairy coffee whiteners wherein the reformed casein micelles are included in a whitener formulation in lieu of the fat component typically included in such formulations. Non-dairy coffee whiteners containing reformed casein micelles have the functional and organoleptic properties normally found in conventional non-dairy whiteners, such as good whitening ability, upon addition to coffee, bland flavor, non off-odor, and a high degree of stability.

DETAILED DESCRIPTION OF THE INVENTION

In accordance with the present invention, reformed casein micelles are produced from an aqueous solution or dispersion of commercially available processed casein by the sequential addition, over an extended period of time, of calcium ions and a soluble phosphate salt under controlled shear. The reformed casein micelles thus produced are washed and concentrated and are suitable for use as a complete or partial replacement for fat in a variety of food products, particularly coffee whiteners.

Any commercially available processed casein material may be used in the present invention. Preferably acid casein, such as HCl-casein, and alkali metal caseinates, particularly sodium caseinate, are used. Such processed casein containing materials are widely available and are produced by procedures well known in the industry. During such production procedures, casein micelles are destroyed so that the casein in such commercially available processed material is not present in micellar form.

The commercially available processed casein is admixed with an aqueous medium, such as water, at a temperature in the range of about 5° C. to 75° C., preferably between about 40° C. to 65° C., to form an aqueous casein solution or dispersion which preferably has a total solids content of between about 10% to 15%. The amount of commercially available casein in the aqueous solution/dispersion may, of course, vary outside this preferred range. If an acid casein is used as the starting material, the pH of the aqueous medium is adjusted to 6.0 or above, preferably between about 6.3 and 6.8, such as by the addition of sodium hydroxide or other suitable alkali to the aqueous medium, in order to solubilize the acid casein.

Calcium ions, preferably in the form of an aqueous solution of a soluble calcium salt, are added to the casein/caseinate solution or dispersion, with agitation over an extended period of time, that is, at least about 15 minutes, preferably 20 minutes or more. The calcium salt must be approved for use in foods and must provide sufficient readily available calcium ions in solution to interact with the casein material to form casein micelles. Preferably edible calcium salts having a high degree of solubility, such as calcium chloride, calcium acetate, and the like are used, with the calcium salt being present in an amount sufficient to provide a ratio of between about 0.01 to 0.1 parts by weight of calcium ions per part by weight of casein in the aqueous reaction medium.

When addition of the calcium ions is completed, a soluble phosphate salt is added to the aqueous reaction medium to stabilize the casein micelles formed by the addition of calcium ions. The phosphate salt is added in an amount sufficient to provide the aqueous reaction medium with a ratio of between about 0.01 to 0.2 parts by weight of phosphate ion per part by weight of casein. The disodium or dipotassium salts of phosphoric acid are typically used, although other sodium and potassium phosphates are suitable, such as trisodium or tripotassium phosphate, tetrasodium pyrophosphate, and the like. Monobasic phosphate salts are generally too acidic and are not desirable.

An alkali, typically sodium hydroxide, preferably is included with the phosphate salt added to the reaction medium, to provide the aqueous reaction medium with a pH in the range of between about 6.3 and 6.8 in order to maintain the integrity of the casein micelles. In accordance with one embodiment, an aqueous solution containing the desired amounts of phosphate salt and alkali is prepared and added, with agitation, to the aqueous reaction medium.

The casein micelles reformed in situ in the aqueous reaction medium have a mean diameter particle size of between about 0.1 to 0.5 microns, and more particularly between about 0.2–0.3 microns, when particle size distribution is determined by distribution analysis of the readings obtained using a Nicomp particle size analyzer.

Preferably, the aqueous reaction medium containing the reformed casein micelles is concentrated such as by ultrafiltration or diafiltration to remove excess salts therefrom and increase the concentration of casein micelles in the aqueous medium. Ultra filtration procedures are well known in the dairy industry. Standard commercially available ultrafiltration membranes are used. These membranes pass water and the soluble salts, with the reformed casein micelles being retained in the retentate. In accordance with a preferred embodiment, the aqueous reaction medium is concentrated by ultrafiltration by passing it through a membrane having a molecular weight cutoff of 100,000 Daltons to reduce the volume of the aqueous reaction medium by about one to five times.

The resulting retentate may be used as such or may, if desired, be subject to diafiltration to further reduce the salt levels. Diafiltration procedures are well known in the dairy industry and involve diluting the retentate back to its original volume by adding water to the retentate and then subjecting the diluted retentate to ultrafiltration.

The reformed casein micelles produced by the present invention are suitable for use as a complete or partial replacement for fat in a variety of food products with the micelles being used in the form of either a liquid or a spray dried powder. In preparing the micelles in powder form, the retentate is combined with a drying aid, such as maltodextrin, and spray dried under conditions typically used in the dairy industry. The reformed casein micelles are particularly well suited for use as a coffee whitener. That is, the reformed casein micelles may be added to coffee as such to effectively whiten the coffee. Alternatively the reformed micelles, in either liquid or spray dried form may be used in preparing a fat-free non-dairy coffee whitener, that is, a whitener having a fat level of less than about 0.5%. A typical, commercially available liquid coffee whitener will contain:

| Ingredient | Amount (% by wt.) |
| --- | --- |
| Fat | 3.0–18.0 |
| Carbohydrate | 2.5–6.0 |
| Protein | 1.0–3.0 |
| Emulsifier | 0.3–0.5 |
| Stabilizer | 0.1–0.2 |
| Stabilizing Salt | 0.1–1.5 |
| Water | q.s. to 100% |

It is generally recognized that vegetable fat or oil is an essential ingredient in coffee whiteners, for it provides whitening power, body and viscosity. That is, the whitening effect produced upon addition to coffee is primarily due to light reflected from the surface of finely emulsified fat globules. Due to concern in recent years regarding health problems resulting from the high fat content of the average diet, there has been increased interest in the development of materials for use as a replacement for fat in food products. However, none of the non-dairy fat replacer products available prior to the present invention has the functional and organoleptic properties required in a non-dairy coffee whitener. The use of the reformed casein micelles of the present invention provides an effective alternative, both functionally and organoleptically, to the use of fat or oil in non-dairy coffee whitener formulations.

The fat free coffee whitener of the present invention is prepared using conventional coffee whitener manufacturing procedures and ingredients, with the exception that reformed casein micelles are used instead of vegetable fat or oil. For example, a carbohydrate, such as corn syrup solids, sucrose, dextrose, and the like may be used in the percentages indicated above to provide desired sweeteners, body and viscosity characteristics to the whitener. One or more hydrophilic colloids such as, for example, xanthan gum, locust bean gum, guar gum, and the like may be added to control body and viscosity of the whitener. Such hydrophilic colloids, if used, are usually added at a level of about 0.5% to 1% by weight of the liquid whitener formulation. Additional buffering salt, such as sodium carbonate, sodium bicarbonate may be required for use in strong or highly acidic coffee. Preferably sufficient buffering agent is included in the whitener formulation so that upon addition to coffee, the whitened coffee has a pH in the range of about 6.3 to 6.8.

The aqueous whitener formulation may be used in liquid form or may be spray dried to provide a powdered, fat free whitener.

While the reformed casein micelles of this invention have been described in particular as a complete or partial replacement for fat in coffee whiteners, it will be understood that the reformed micelles are suitable for use as a fat replacer in a number of other products, such as sauces, spreads, dips, frozen or refrigerated desserts and other creamy products, which have a pH greater than that at which casein micelles agglomerate, i.e. greater than about 5.6.

The following examples are provided to illustrate, not to limit, the invention. All parts and percentages are by weight unless otherwise indicated.

EXAMPLE I

A fat free, liquid non-dairy coffee whitener is prepared by the following procedure:

A sodium caseinate solution is prepared by adding 126 gm of commercially available powdered sodium caseinate to a liter of hot tap water in a 2-l. Erlenmeyer flask, and mixing with an overhead stirrer. The caseinate solution is heated to about 55° C. in a hot water bath and 96.9 gm of an aqueous 8.87% calcium chloride solution is metered into the caseinate solution, with constant mixing over a 20 minute period of time. Upon completion of addition of the calcium chloride solution, 60.0 gm. of a solution containing 17.1% dipotassium phosphate and 1.8% sodium hydroxide is introduced into the aqueous reaction medium, with constant mixing, over a period of 6 minutes.

590 gm of the resulting reformed casein micelle suspension at 50°–55° C. is ultrafiltered by being pumped through a hollow fiber membrane system having a molecular weight cutoff of 100,000. Thereafter, 590 gm of distilled water is added to the micelle suspension retentate and the diluted retentate is ultrafiltered again resulting in a 1× diafiltration.

A fat free whitener is prepared by mixing a dry blend of 3.0 gm of sucrose and 0.5 gm locust beam gum with 96 gm of the diafiltered reformed casein micelle suspension. The resulting whitener solution is homogenized at 2500 psi and pasteurized (80° C. for 5 min.) and then evaluated for whitening ability, taste and flavor in coffee. In this evaluation, 21.2 gm of the whitener solution was added to 84.1 gm of a 1% solution of soluble coffee in distilled water. As a result, the coffee is whitened effectively and has good taste and flavor.

The retentate may, if desired, be spray dried such as by adding a suitable amount of low DE maltodextrin to the diafiltered retentate (e.g. 0.2 to 0.3 parts by wt. maltodextrin per part by wt. retentate), after which the resulting mix is pasteurized (e.g. 30 sec., 80° C.) and spray dried under conventional spray drying conditions. The spray dried retentate may be combined with the ingredients used above to provide a powdered whitener.

EXAMPLE II 12.2 kg of commercially available sodium caseinate is solubilized in 96.8 kg of hot water (55°-65° C.) in a recirculating mixing system, and the solubilized caseinate solution is pumped into a holding tank. A solution of 1.1 kg of calcium chloride dihydrate in 8.4 kg water is pumped into the caseinate solution with agitation (500-1700 rpm) over a period of 20 minutes, at which time a solution of 1.1 kg of dipotassium phosphate and 117 gm sodium hydroxide in 5.2 kg water is metered into the aqueous reaction medium at a rate of 0.9 kg/min. The resulting aqueous reaction medium thus obtained, which contains reformed casein micelles, is ultrafiltered and diafiltered in accordance with the procedure of Example I.

The reformed casein micelles in the retentate have a mean diameter of 0.3 microns as determined using a Nicomp particle size analyzer. The resulting retentate was evaluated as a whitener in coffee by adding 21.2 gm of the retentate to 84.1 gm of a 1% solution of soluble coffee. The pH of the whitened coffee was 6.35. The whitening effect of the reformed casein micelles was determined colormetrically using a calibrated Gardner/Neotec Colorgrad System 2000 Colorimeter to measure light reflected from the surface of the whitened coffee. The "L" scale of this instrument, which ranges from 0 to 100, is a measure of lightness-darkness. That is, the higher the "L" scale value, the lighter the color. The coffee solution whitened with the reformed casein micelles retentate has an "L" scale reading of 53.85, which is comparable to coffee whitened with a comparable amount of commercially available liquid coffee whitener which typically has an "L" scale reading in the range of about 50–55.

EXAMPLE III 123.7 gm of commercially available acid casein is added to 963.5 gm of water (50° C.) in a 2-l Erlenmeyer flask equipped with an overhead stirrer. A solution of 3.95 gm sodium hydroxide in 39.5 gm of water is added to the flask, with stirring, until the pH of the aqueous medium stabilizes at 8.3 (about 5–10 mins.) to solubilize the acid casein. 97.8 gm of an 11.8% solution of calcium chloride dihydrate in water is added to the reaction medium, with stirring, over a 20 minute period, after which 65.7 gm of a 17.1% solution of dipotassium phosphate in water is added. The aqueous reaction medium, which contains reformed casein micelles of a particle size similar to those found in Example I, is evaluated in coffee for its whitening ability by adding 21.2 gm of the reaction medium to 84.1 gm of a 1% solution of soluble coffee. The whitened coffee has an "L" scale reading of 51.35 and a pH of 6.8.

EXAMPLE IV

A whitened liquid coffee beverage which is retort stable is prepared as follows, using the reformed casein micelles of the present invention:

A whitened, sweetened coffee beverage is prepared by adding 272 gm of sucrose, 52 gm of soluble coffee powder and 3.6 gm of dipotassium phosphate to 2992.4 gm of hot (70° C.) water. This coffee solution is whitened by adding 680 gm of the reformed micelle-containing aqueous reaction medium retentate, such as produced in Example I. The whitened coffee beverage is filled into 13.2 oz. glass jars which are sealed and retorted for 20 min. at 120° C. The retorted whitened coffee has a pH of 6.5, with little sediment in the jar, with the reformed micelles providing good whitening in the coffee.

EXAMPLE V

A low-fat chicken sauce (3% fat) having a texture and taste similar to that of a conventional full fat (16% fat) cream chicken sauce is prepared by mixing the following ingredients:

| Ingredient | Weight (gm) |
| --- | --- |
| Reformed Casein Micelles (10–12% TS) | 425 |
| Chicken Flavor Concentrate | 26 |
| Canola Oil | 20 |
| Polar Gel (modified starch) | 12 |
| Low DE Maltodextrin | 10 |
| Water | 507 |

The dry ingredients, plus oil, are blended together and added to the liquid ingredients with sufficient mixing for complete dispersion. The resulting mixture is heated in a double boiler with constant agitation to a temperature to effect starch gelatinization, e.g. 85° C. and provide a smooth sauce having a texture similar to that of a conventional full fat cream chicken sauce.

EXAMPLE VI

A fat-free frozen dessert having a creamy texture like full fat ice cream is prepared using the following ingredients:

| Ingredient | Weight kg |
| --- | --- |
| Non Fat Dry Milk | 5.90 |
| Sugar | 5.45 |
| Corn Syrup Solids (36DE) | 3.18 |
| Stabilizer (gold Star NFB) | 0.55 |
| Reformed Casein Micelles (12% solids) | 7.72 |
| Water | 22.7 |

The above ingredients are mixed, pasteurized, homogenized and frozen using procedures typically used in ice cream production. The resulting fat-free frozen dessert has a taste and texture similar to that of full fat ice cream.

What is claimed is:

1. A powdered coffee whitener which comprises a spray dried dispersion of reformed casein micelles which have been formed in situ by the sequential addition of a soluble source of calcium ions and a soluble source of phosphate ions to an aqueous medium containing a processed casein material having substantially no casein in micelle form.

2. The whitener defined in claim 1 in which the processed casein material is selected from the group consisting of acid casein, alkali metal caseinate, and mixtures thereof, the source of calcium ions is a soluble calcium salt, and the source of phosphate ions is a soluble phosphate salt.

3. The whitener defined in claim 1 in which the spray dried dispersion of reformed casein micelles is blended with a carbohydrate, from 0.05 to 1% by weight of a hydrophilic colloid, and sufficient buffering agent so that on addition of the whitener to coffee the coffee has a pH of about 6.3 to 6.8.

* * * * *